US011335323B2

(12) United States Patent
Collins

(10) Patent No.: US 11,335,323 B2
(45) Date of Patent: May 17, 2022

(54) METHOD FOR COMMUNICATING A NON-SPEECH MESSAGE AS AUDIO

(71) Applicant: MASTERCARD INTERNATIONAL INCORPORATED, Purchase, NY (US)

(72) Inventor: Robert Collins, Dublin (IE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 174 days.

(21) Appl. No.: 16/777,550

(22) Filed: Jan. 30, 2020

(65) Prior Publication Data

US 2020/0251088 A1 Aug. 6, 2020

(30) Foreign Application Priority Data

Jan. 31, 2019 (EP) .................................... 19154877

(51) Int. Cl.
*G10L 13/08* (2013.01)
*G10L 13/047* (2013.01)
*G10L 13/00* (2006.01)
*G10L 19/00* (2013.01)

(52) U.S. Cl.
CPC ............ *G10L 13/047* (2013.01); *G10L 13/00* (2013.01); *G10L 19/0018* (2013.01); *G10L 2019/0001* (2013.01)

(58) Field of Classification Search
CPC ..... G10L 13/02; G10L 13/027; G10L 13/033; G10L 13/04; G10L 13/06; G10L 13/08;
(Continued)

(56) References Cited

U.S. PATENT DOCUMENTS 8,645,303 B2 * 2/2014 Watanabe ............... H04L 67/02
706/47
2002/0173956 A1 11/2002 Hartley et al.
(Continued)

FOREIGN PATENT DOCUMENTS

KR 1020070103816 A 10/2007
KR 10-2013-0135567 A 12/2013
KR 10-1406983 B1 6/2014

OTHER PUBLICATIONS

Extended European Search Report Issued in European Application No. 19154877.5, dated Jun. 27, 2019, 8 pages.
(Continued)

*Primary Examiner* — Qi Han
(74) *Attorney, Agent, or Firm* — Talem IP Law, LLP

(57) ABSTRACT

A method is provided for communicating a non-speech message as audio from a first device to a second device such that information can be passed between the first and second device. The method includes: encoding the non-speech message as a dissimilar speech message having a plurality of phonemes; transmitting the speech message over one or more audio communications channels from the first device; receiving the speech message at the second device; recognizing the speech message; and decoding the dissimilar speech message to the non-speech message. By using existing audio functionality, and the increasingly more reliable voice recognition applications, an improved method is provided for sharing complex data messages using commonly available communication channels.

15 Claims, 3 Drawing Sheets

(58) Field of Classification Search
CPC ......... G10L 15/00; G10L 15/01; G10L 15/02;
G10L 15/06; G10L 15/08; G10L 15/20;
G10L 15/22; G10L 15/24; G10L 15/26;
G10L 2015/025; G10L 13/047; G10L
2015/022; G10L 2015/027; G10L
2015/0631–0638; G10L 2015/221–228
USPC ..... 704/273, 270, 270.1, 272, 276, 277, 278
See application file for complete search history.

(56) References Cited

U.S. PATENT DOCUMENTS

| | | | | |
|---|---|---|---|---|
| 2007/0260456 | A1* | 11/2007 | Proux | G10L 15/26 704/235 |
| 2015/0317979 | A1 | 11/2015 | Yang et al. | |
| 2016/0163316 | A1 | 6/2016 | McLean | |
| 2017/0316194 | A1* | 11/2017 | Wang | G06F 21/84 |
| 2018/0374483 | A1 | 12/2018 | Florexil | |

OTHER PUBLICATIONS

S. Josefsson, "The Base16, Base32, and Base64 Data Encodings", Internet Engineering Task Force, Oct. 1, 2006, 18 pages, https://tools.ietf.org/html/rfc4648.

International Search Report and Written Opinion issued in International Application No. PCT/US2019/061623, dated Mar. 5, 2020, 12 pages.

Office Action issued in European Application No. 19154877.5, dated Dec. 8, 2021, 5 pages.

\* cited by examiner

METHOD FOR COMMUNICATING A NON-SPEECH MESSAGE AS AUDIO

TECHNICAL FIELD

The present disclosure relates to a method for communicating a non-speech message as audio, a non-speech message encoder, and a non-speech message decoder.

BACKGROUND

There are many instances in which information needs to be passed between a first and second computer system/devices. For example, when browsing the internet on the first device, a laptop, a user may wish to send the URL (Uniform Resource Locator or web address) of the current website to a second device, his mobile device. If the URL is relatively short, it may be remembered and retyped on the mobile device. If too long or complex, it may be emailed to the user's own email account, but this is not convenient.

A further option is to use a QR code—a plugin in the browser of the first device is used to generate a QR code on the screen, which may be scanned using the camera of the second device. This is also not convenient, requiring a camera to capture the code, and the length of the URL directly affects the legibility of the QR code.

Other alternatives require the first and second devices to share a user account, such as Google or Outlook, which allow data to be shared. However, there is no visibility to the user about what is shared and when.

An audio channel may also be used—for example, the user may turn on voice (speech) recognition on a second device, such as a digital assistant, and then read out a URL of a website displayed on a screen of the first device. However, the URL may not function correctly if one character is incorrect and the voice recognition is currently not accurate enough for this transfer of information to be sufficiently reliable. In addition, more complicated information is even more sensitive to data corruption at the bit level.

Transmission of data messages using audio has been implemented for many years using multi-frequency signaling, such as DTMF, to communicate a telephone and routing numbers to an exchange over a telephone line or voice channel. The message is encoded as a series of tones, and transmitted over the audio channel. Upon receiving the tones, the exchange recognizes the tones and decodes this audio message to the telephone and routing numbers and routes the call accordingly. The series of tones is a succession of audio bursts, designed to be distinguishable from each other—however, the number of different audio burst which may be distinguished is limited. For transmission of telephone and routing numbers, which only required the digits 0 to 9 and two special symbols # (hash or octothorpe) and * (asterisk or star), this system was sufficient. However, for more complex messages, it becomes more difficult for the receiver to distinguish between the different audio bursts.

Higher rates of data transfer over telephone lines have been implemented using modems, which use frequency modulation, such as Frequency-Shift Keying (FSK) or Phase-Shift Keying (PSK), to encode a data message as a series of audio tones and to transmit over a telephone line. However, these more complicated data messages required fixed telephone line connections and complex error correction for reliable transmission.

It is an object of the invention to provide an improved method for sharing complex data messages using commonly available communication channels.

BRIEF SUMMARY

According to a first aspect of the present disclosure, there is provided a computer-implemented method for communicating a non-speech message as audio from a first device to a second device, the method comprising: encoding the non-speech message as a dissimilar speech message having a plurality of phonemes; transmitting the speech message over one or more audio communications channels from the first device; receiving the speech message at the second device; recognizing the speech message; and decoding the dissimilar speech message to the non-speech message.

Many mobile devices and laptops already contain a microphone, allowing audio to be detected and recorded. Voice-recognition (or speech recognition) software is often also provided or may be added using a suitable software application (or app). In addition, digital assistants are becoming more popular, providing an increasingly reliable form of speech recognition that is continuously improving. Most mobile devices and laptops also comprise an audio speaker. Voice generation software may also be provided or added using a suitable app, allowing speech synthesis to be performed. By using these facilities, a more reliable communication method is provided for non-speech messages. A further advantage is that the user is aware that a speech-like message is being transmitted as it is audible, even though the user may not be able to understand the contents of the speech-like message. Some users prefer to be aware when sensitive information, such as credit card details, is being transmitted.

According to a second aspect of the present disclosure, the speech message transmitted comprises a plurality of speakable words.

Natural-language systems perform with higher accuracy when actual words are used, and the voice-recognition systems are being continuously improved to increase the reliability of speech recognition by testing and tuning using actual words.

According to a further aspect of the present disclosure, the method further comprises at least partially determining a moment of transmission of the speech message based on input from a user.

As the non-speech data may comprise sensitive information, such as bank account numbers, a user may wish to wait and decide the exact moment that the audio transmission is to start and/or be finished.

According to a still further aspect, the method comprises at partially determining the content of the non-speech message based on input from a user.

If there is more than one option for the non-search data, a user may wish to select the option to be transmitted before transmission occurs.

According to yet another aspect of the present invention, the method further comprises generating a speakable word code book for encoding and decoding by: selecting a list of speakable words to create an initial set, selecting a fixed number from the initial set and assigning each one a binary reference value to create the speakable word code book.

Generating a code book of speakable words provides a higher degree of standardization, which in turn may result in a higher degree of interoperability, depending on how widely available the code book is made. It may also be used to exclude third-parties from the functionalities made available after transferring the non-speech message to the second device.

According to another aspect of the present invention, the method further comprises removing words from the initial set and/or speakable word code book based on phonetic similarity.

This may increase the accuracy of recognition as words that may be confused are reduced.

According to another aspect of the present invention, the method further comprises at least partially determining the content of the speakable word code book based on input from a user.

It may be advantageous to allow a user to select which code book is selected—this may occur once, or may occur a plurality of times.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments, and which are not necessarily drawn to scale, wherein.

DETAILED DESCRIPTION

In the following detailed description, numerous non-limiting specific details are given to assist in understanding this disclosure. It will be obvious to a person skilled in the art that the method may be implemented on any type of standalone system or client-server compatible system containing any type of client, network, server, and database elements.

Figure 1:
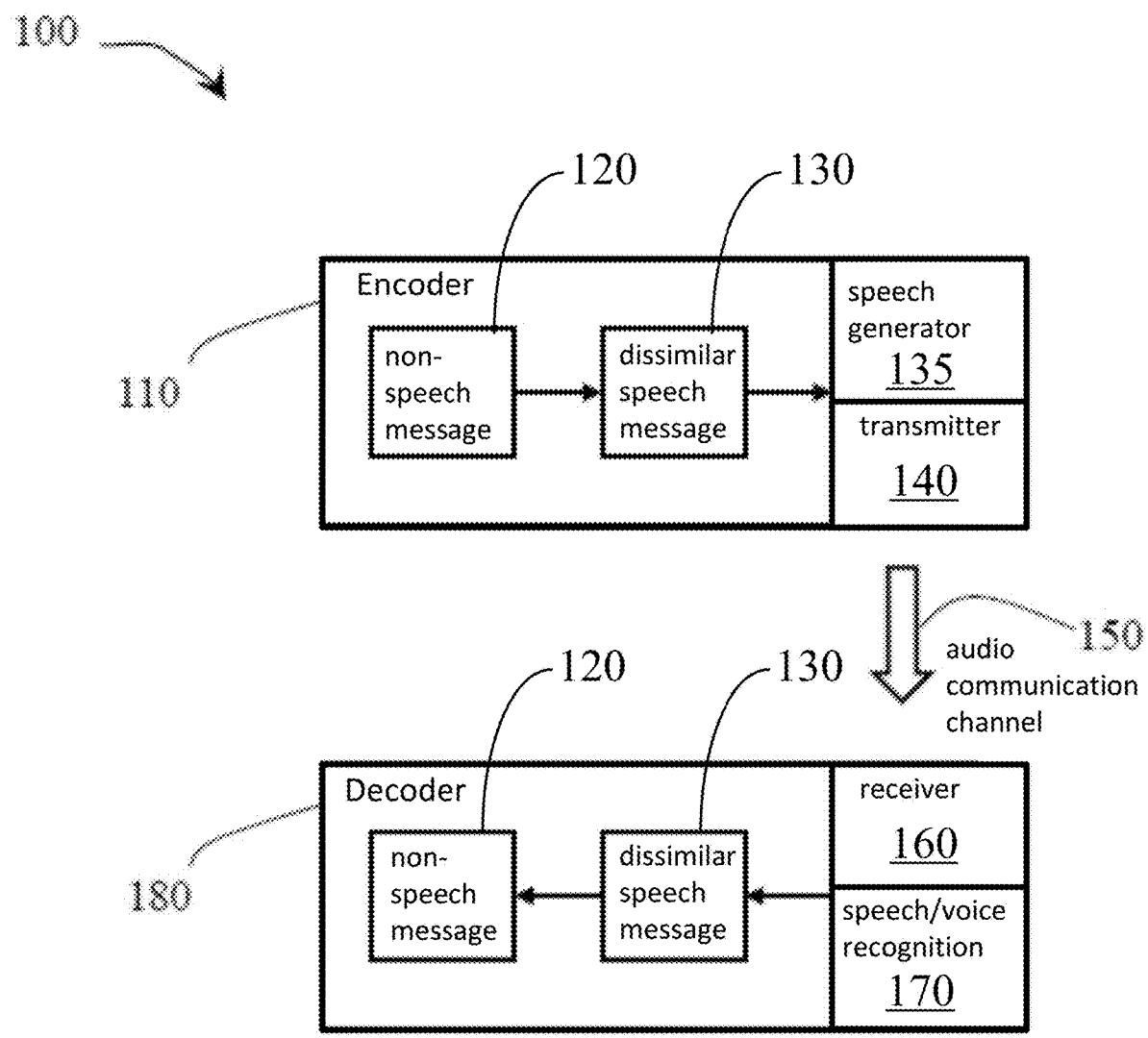
FIG. 1 depicts a computer-implemented method 100 for communicating a non-speech message 120 using audio.

FIG. 1 depicts a computer-implemented method 100 for communicating a non-speech message 120 from a first device (not depicted) to a second device (not depicted) using audio.

An encoder 110 is provided, configured and arranged to encode a non-speech message 120 as a dissimilar speech message 130.

A message is considered non-speech 120 if it represents information other than speech. It may comprise alphanumeric or numerical characters, but these represent something other than speech. For example:

| Non-speech Message | contains | which represents |
|---|---|---|
| URL | alphanumerics | web address |
| IBAN data | alphanumerics | bank account data |
| PAN | numerics | credit card data |
| IP address | alphanumerics | web address |
| token | binary | authentication data |

Numbers and letters (alphanumerics) may be speakable as corresponding words, and even provided in a sequence, but this is still a non-speech message 120 in the context of this disclosure. For example, a credit card number may be read out as "five" "three" "seven" "four"—this is a non-speech message 120 because the credit card data (source message) is being transmitted. However, when read out this way, the words used correspond directly to pieces of the non-speech data 120. In other words, "five" "three" "seven" "four" is a similar speech message to the non-speech message 120, and that is specifically excluded in this disclosure as the non-speech message 120 is converted to a dissimilar speech message 130.

Note that labelling or describing something a "number" (numerics) does not exclude the case where it also comprises letters, for example hexadecimal numbers. "Alphanumeric" includes not only letters and numbers, but also punctuation symbols, mathematical symbols and other special characters.

The encoder 110 is further configured and arranged to encode the non-speech message 120 as a dissimilar speech message 130 having at least one phoneme. The goal is to encode any possible values (including random characters) into something that can be:

transformed into speech using a suitable speech generator 135, such as through an audio speaker, through a transducer, spoken by a human voice, and any combination thereof;

transmitted (e.g., via transmitter 140) through one or more audio communications channels 150. It is particularly advantageous if the audio channel is optimized to transmit speech as this may reduce distortion of the message and increase reliability of recognition.

detected (received) with a speech receiver 160 such as with a microphone, with a transducer, and any combination thereof; and recognized using speech recognition (voice recognition) 170.

The functionality comprised in the encoder 110 may be comprised in one or more devices and/or distributed over one or more networks. For example, the transmitter 140 may be comprised in a digital assistant, a vehicle, a mobile device, a laptop computer, a desktop computer, or any combination thereof. A plurality of transmitters 140 may be used to send the speech message 130 over one or more audio communications channels.

The one or more audio communications channel 150 may also comprise (not depicted) an audio relay, configured to receive the message and to repeat it, optionally with some degree of amplification. This relay may operate using mechanical, acoustical and/or electronic principles. It may also be a human, such as a user, who hears the message and uses a human voice to repeat the message.

The encoder 110 further comprises a transmitter 140, configured and arrange to transmit the speech message 130 over one or more audio communications channels 150. The one or more audio communications channels 150 may comprise one or more of the following: open-air; a wire; a cable; a fiber; an electromagnetic link; an optical link; a radio link; a microwave link; an infrared link; a satellite link; a land-line telephone (POTS); a voice channel of a mobile telephone; an analog channel; a digital channel; a network; a server computer; a client computer, or any combination thereof.

In general, open-air is preferred as that provides the most flexibility and a high degree of compatibility.

A decoder 180 is also provided, configured and arranged to:

receive (via receiver 160) the speech message from the audio communications channel 150;

recognize (via speech/voice recognition 170) the speech message 130; and decode the dissimilar speech message 130 to the non-speech message 120.

The functionality comprised in the decoder 180 may be comprised in one or more devices and/or distributed over one or more networks. For example, the receiver 160 of the speech message 130 may be comprised in a digital assistant, a mobile device, a vehicle, a laptop computer, or a desktop computer. A plurality of receivers 160 may be used to receive the speech message 130 from one or more audio communications channels.

In the known systems, data messages sent using multi-frequency signaling, such as DTMF, and those transmitted by modems may be considered to be non-speech messages. A telephone line or voice channel may be considered an audio channel (a channel suitable for transmitting audio signals). However, the series of audio bursts transmitted are not speech messages—they do not resemble human speech in any known language, they do not comprise phenomes and do not comprise speakable words. Detection of these audio bursts is not performed using speech (or voice) recognition in these known systems.

One of the insights upon which the invention is based is that many mobile devices and laptops already contain a microphone and voice-recognition (or speech recognition) software. In addition, digital assistants are becoming more popular, providing an increasingly reliable form of speech recognition that is continuously improving. The improvement is achieved by better algorithms and more speech training. Most mobile devices and laptops also comprise an audio speaker, allowing speech synthesis to be performed. By using these facilities, a more reliable communicate method is provided for non-speech messages using audio.

A further advantage of using audio is that the user is aware that a speech-like message is being transmitted as it is audible, even though the user may not be able to understand the contents of the dissimilar speech message 130. Some users prefer to be aware when sensitive information, such as credit card details, are being transmitted.

Additionally, security may be improved if the speech message 130 is dissimilar to the source message 120, and not trivially decodable by third-party who overhears the transmission from the audio communications channel 150, or a third-party audio receiver that is not configured to decode the dissimilar speech message 130. This is particular useful in an environment where a plurality of receivers 160 are continuously capturing audio, and sensitive data such as PIN codes, credit card numbers or CVC codes are comprised in the source message 120.

The principle operation of the invention with be further illustrated by several non-limiting embodiments and examples.

Example 1: a user may wish to transmit a web address (source message) for an interesting article from a first device, a laptop computer to a second device, a mobile device: http://fortune.com/2017/07/05/alibaba-tmall-genie-voice-assistant/

The 66 alphanumeric characters represent a URL—this is the non-speech message 120 to be shared in this example. It contains only alphanumerical information—English language characters A-Z, 0-9 and several punctuation symbols.

The first device may be configured to display a symbolic representation 125 (not depicted in FIG. 1) to a user—this symbolic representation 125 is typically presented using alphanumerical characters, and will be typically be displayed almost identical to the non-speech message 120.

Such an URL is too long to be easily remembered, and too complicated to be re-typed on the second device without a high probability that a mistake will be made and the look-up operation on the second device will fail.

A user may attempt to transmit this non-speech message 120 (URL) using audio without any encoding (e.g., by encoder 110) and without any decoding (e.g., by decoder 180). For example, by using a speech generator to read out each character individually. This could be represented in Speech Synthesis Markup Language (SSML) as:

<speak><say-as interpret-as="spell-out">
http://fortune.com/2017/07/05/alibaba-tmall-genie-voice-assistant/
</say-as></speak>

Using a speech generator 135, such as a Text-To-Speech converter that produces natural language, this SSML may be rendered as an MP3 audio stream of characters of about 20 seconds long. Amazon Polly may be used, for example.

This audio stream may be played through an audio speaker (e.g., transmitter 140) of the first device, the laptop, transmitted through the air (e.g., communication channel 150) (which is suitable for audio communications) and received by a microphone 160 of the second device, the mobile device.

The mobile device in this example comprises voice-recognition (or speech-recognition) software, allowing the transmitted stream of audio characters to be recognized one-by-one. By converting the stream of characters, the original non-speech message 120 may be reconstructed, and the URL used to access the desired website.

Although this seems a simple way to share complex data messages, there are some disadvantages to transmitting the non-speech message 120 in this way:

it is relatively long at 20 seconds, making it sensitive to changes affecting the audio communications channel 150. For example, transmission over an open-air channel may be interrupted by unexpected noises, requiring retransmission or simply causing failure when the non-speech message 120 is used for its intended purpose—here for finding a web page due to one or more corrupted audio character;

natural-language processing systems are usually trained to understand words from a known language. They are less accurate at interpreting separate characters, especially as some characters such as "p" and "b" sound alike;

one or more characters may be lost at the beginning if the receiver 160 functionality is voice-activated, although this may be solved by including padding characters such as "===";

one or more characters may be lost at the end if transmission unexpectedly end due to, for example, the transmitting device 140 entering a power-saving mode.

In Example 1, the non-speech message 120 and the speech message transmitted (e.g., via transmitter 140) correspond to a very high degree. They are highly similar, and may even be described as substantially identical. The non-speech message 120 is divided into 66 pieces, with each of the pieces being an individual character. No encoding occurs, and an audio stream directly corresponding to the pieces of the non-speech message 120 are transmitted in the speech message.

Example 2: The overall length of the audio message transmitted in Example 1 is influenced by the silence between individual characters as the message is spelled out.

In a second example, the length of the audio stream may be reduced by not instructing the speech generator 135 (for example, the Text-To-Speech converter) to spell out the message, for example:

```
<speak> http://fortune.com/2017/07/05/alibaba-tmall-
genie-voice-assistant/</say-as></speak>
```

The transmission and receipt of the audio stream are the same as described above for Example 1, and again no encoding (e.g., by encoder 110) or decoding (e.g., by decoder 180) is performed. The non-speech message 120 and speech message are similar.

By reducing the number of spaces, this reduces the length of the audio stream to about 14 seconds. This reduction in transmission time reduces the probability that the audio stream will be corrupted.

In Example 2, the non-speech message 120 and the speech message transmitted (e.g., via transmitter 140) correspond to a very high degree. They are highly similar, and may even be described as substantially identical. Also, the non-speech message 120 is divided into individual characters and words. No encoding occurs. Each character and word transmitted directly corresponds to a respective character or word in the non-speech message 120.

Example 3: Although Example 2 reduces the length of the audio stream, most Text-To-Speech engines (speech generators) 135 still spell out the characters if they encounter character groupings that are not recognized as spoken words, and special characters such as "dash" are typically pronounced as words.

Figure 2:
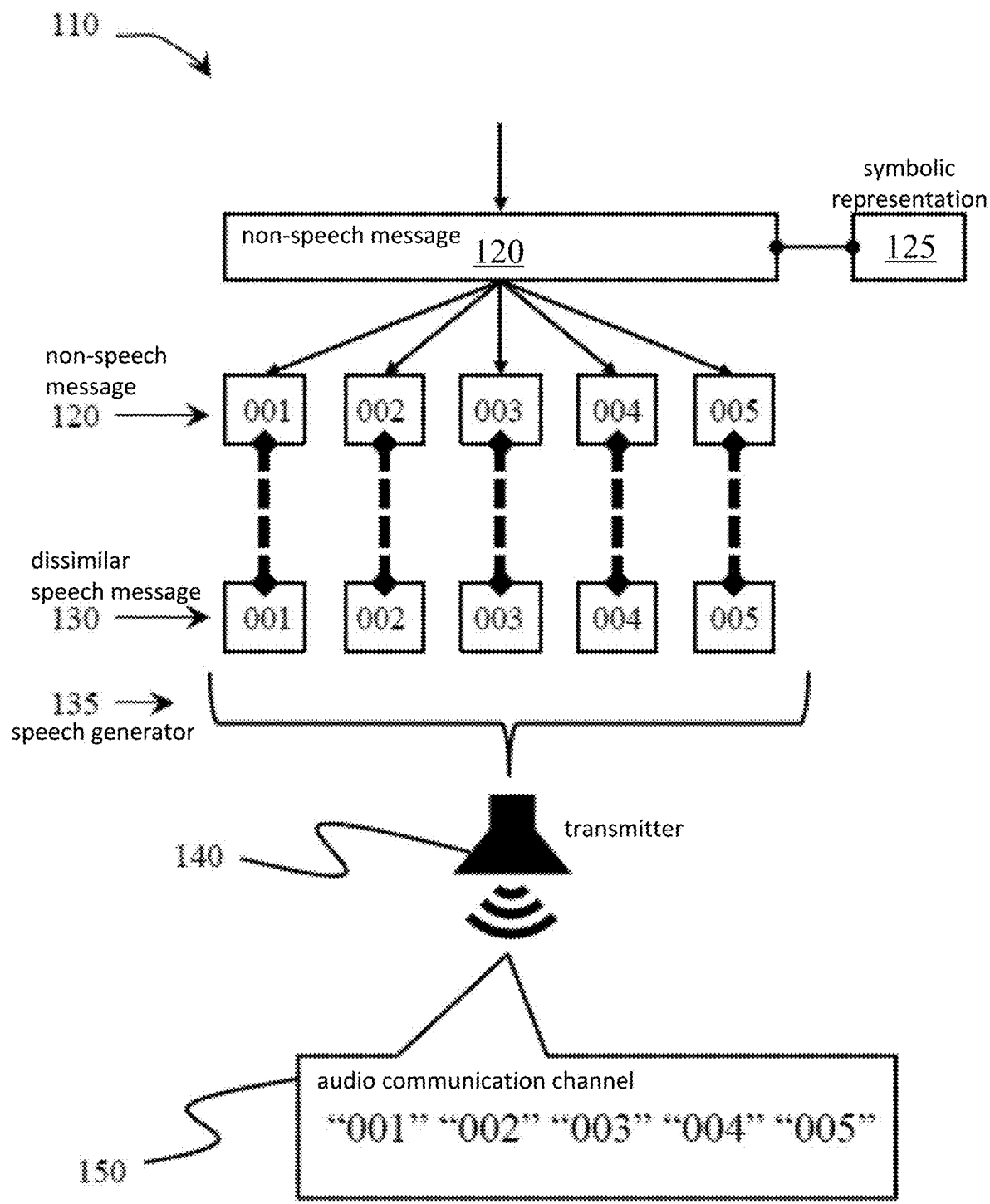
FIG. 2 depicts more details of an example of an encoder and transmitter.
Figure 3:
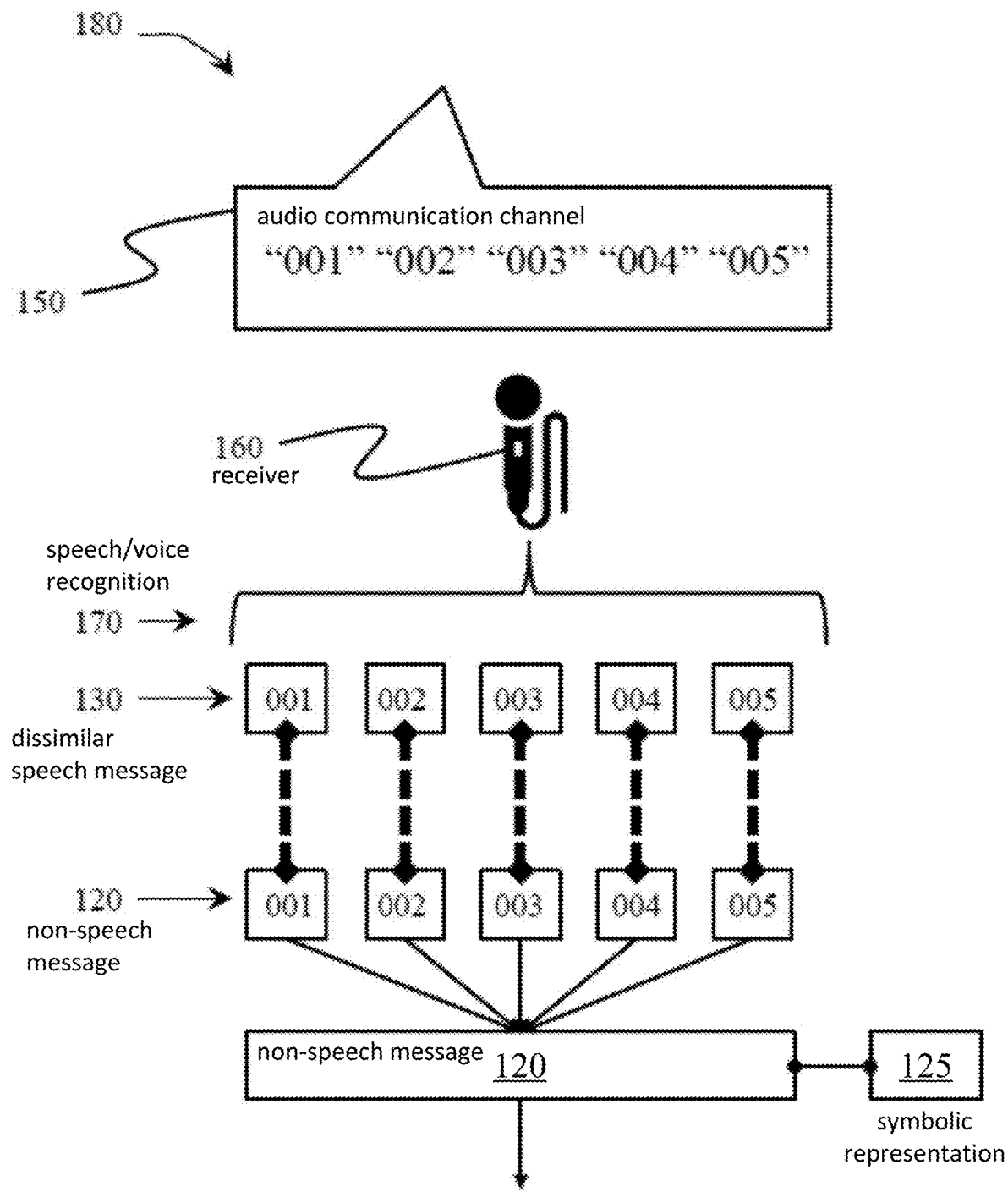
FIG. 3 depicts more details of an example of a receiver and decoder.

Example 3 uses the transmission (e.g., with transmitter 140) and encoding (e.g., with encoder 110) steps depicted in FIG. 1 and FIG. 2, and the reception (e.g., with receiver 160) and decoding (e.g., with decoder 180) depicted in FIG. 1 and FIG. 3.

In this example, the non-speech message 120 to be shared is a one-time passcode for user authentication, to be transmitted from a first device, a mobile device, to a second device, a laptop computer.

The passcode 120 is stored as binary on the mobile device, in for example a passcode file.

Optionally, the mobile device may be configured to display a symbolic representation 125 to the user—this is particularly useful where the user determines, at least partially, the content of the non-speech message 120. For example, if several authentication certificates are stored on the mobile device, the device may be configured to provide a selection menu so that the user may input a preference—in general, a symbolic representation 125, such as the issuer of the certificate and/or a smartcard number, is displayed to the user and not the contents of the certificate to simplify selection. Alternatively or additionally, the user may be prompted for an input which provides approval for the transmission. Alternatively or additionally, the user may be prompted for an input which at least partially determines the moment of transmission.

FIG. 2 depicts the encoder 110 and transmitter 140 (and communications channel 150) configured to perform the method of Example 3. The first device, here the mobile device, comprises at least a speech generator 135 and a transmitter or transducer 140. Optionally, it may be configured to encode the non-speech message 120 into the dissimilar speech message 130. Alternatively the first device may be configured to retrieve the speech message 130, either in pieces 130.001-005 or contiguous, from a remote location over a network. The mobile device may also be configured to co-operate with a remote computer system where the encoding of the non-speech message 120 to the dissimilar speech message 130 is performed.

As depicted in FIG. 2, the passcode 120 is divided into pieces 120.001, 120.002, 120.003, 120.004 and 120.005. Although five pieces are depicted, the skilled person will realize that any suitable number of pieces may be used.

The passcode 120 may be divided into a plurality of pieces 120.001-005, each piece 120.001-005 having five-bits and being encoded using Base32 as a corresponding character 130.001-005.

The advantage of Base32 is that the resulting characters are case insensitive, and no special characters are included which the Text-To-Speech engine must pronounce, such as "dash" (/).

For example, the RFC 4648 Base32 alphabet may be used, with "=" as a padding character, to encode each piece 120.001-005 as a character 130.001-005 of the speech message 130:

| Value | Char. |
| --- | --- |
| 00000 (00) | A |
| 00001 (01) | B |
| 00010 (02) | C |
| 00011 (03) | D |
| 00100 (04) | E |
| 00101 (05) | F |
| 00110 (06) | G |
| 00111 (07) | H |
| 01000 (08) | I |
| 01001 (09) | J |
| 01010 (10) | K |
| 01011 (11) | L |
| 01100 (12) | M |
| 01101 (13) | N |
| 01110 (14) | O |
| 01111 (15) | P |
| 10000 (16) | Q |
| 10001 (17) | R |
| 10010 (18) | S |
| 10011 (19) | T |
| 10100 (20) | U |
| 10101 (21) | V |
| 10110 (22) | W |
| 10111 (23) | X |
| 11000 (24) | Y |
| 11001 (25) | Z |
| 11010 (26) | 2 |
| 11011 (27) | 3 |
| 11100 (28) | 4 |
| 11101 (29) | 5 |
| 11110 (30) | 6 |
| 11111 (31) | 7 |

Note that any similar encoding, such as z-base-32, Crockford's Base32, base32hex may also be used.

The Base32 encoding is applied to its binary storage value, not it's ASCII value, although the ASCII value may be used as a symbolic representation 125 to display to the user.

For example, encoding (e.g., with encoder 110) a passcode (non-speech message) 120 using Base32 may result in the following speech message 130 with 208 characters: OKXI2HYQUWI2G5Q2WQMAITQVWONYZCBEVC-5VZ3MNBSAWVMEE5CL S7576A3DORAQIPAXDX-PJOKHRKVXXSXOJD3JQYLK76T732GWYN7IPTID-UAKER 3G2MDZSQDCACTPTBJC4BWUPIK326HXL-UEKXNOPQIBF2IQUZJPFSYK56NRVMR SQGI3XE-FXOA3YAMYRJD2HMZAB32SXP2UFE===

The speech message 130 comprises a plurality of phoneme—these are the units of sound that distinguish one word from another in a particular language, and which are used in voice-recognition (speech-recognition) algorithms.

The speech message 130 only contains English language characters A-Z and 0-9. A speech generator 135, such as a Text-To-Speech converter may be used to convert the speech pieces 130.001-005, into suitable form for being transmitted. For example, the pieces 130.001-005 may be assembled sequentially for transmission.

```
<speak><say-as interpret-as="spell-out">
  OKXI2HYQUWI2G5Q2WQMAITQVWONYZCBEVC5VZ3MNB
  SAWVMEE5CLS7576A3DORAQIPAXDXPJOKHRKVXXSXOJD
  3JQYLK76T732GWYN7IPTIDUAKER3G2MDZSQDCACTPTBJ
  C4BWUPIK326HXLUEKXNOPQIBF2IQUZJPFSYK56NRVMR
  SQGI3XEFXOA3YAMYRJD2HMZAB32SXP2UFE===
</say-as></speak>
```

This SSML may be rendered as an MP3 speech message 130 of about 48 seconds in length. Using an audio speaker (e.g., transmitter 140) of the mobile device (the first device), the speech message 130 may be played, transmitting (via transmitter 140) the speech message 130 through the air, which is a suitable audio communications channel 150. The speech message transmitted over channel 150 are sequential pieces 130.001-005 of the speech message 130—although depicted as being transmitted from left to right, the skilled person will realize that any suitable order may be used.

FIG. 3 depicts the receiver 160 and the decoder 180, configured to perform the method of FIG. 3. The laptop computer (the second device) comprises at least a speech receiver 160, such as a microphone 160, and is configured to recognize speech (via speech/voice recognition 170), so if the mobile device (first device) is disposed proximate the microphone 160, the laptop computer receives (via receiver 160) the speech message over an open-air channel 150.

Optionally, it may be configured to decode the dissimilar speech message 130 to the non-speech message 120. Alternatively the second device may be configured to provide the recognized (e.g., via speech/voice recognition 170) speech message 130, either in pieces 130.001-005 or contiguous, to a remote location over a network. The laptop computer may also be configured to co-operate with a remote computer system where the decoding of the dissimilar speech message 130 to the non-speech message 120 is performed.

The laptop computer comprises voice-recognition 170 (or speech-recognition) software, allowing the transmitted speech message 130 to be recognized (via speech/voice recognition 170). As the speech message 130 was transmitted in pieces 130.001-005, the recognition 170 is preferably configured and arranged to recognize the same pieces 130.001-005.

The second device is configured and arranged to perform the corresponding decoding (via decoder 180)—in this case, using the same Base 32 representation to convert the recognized dissimilar speech message pieces 130.001-005 to the corresponding pieces of the non-speech message 120.001-005. The passcode 120 may then be reconstituted, and the passcode file used as desired.

In Example 3, the non-speech message 120 and the speech message 130 are not substantially identical—they are dissimilar. Although one or more character transmitted in the speech message 130 may correspond to one or more respective character in the non-speech message 120, there is no direct correspondence—most of the characters do not correspond, and that is why the speech message 130 is described as dissimilar.

Example 4: The speech message 130 transmitted in Example 3 is relatively long at 48 seconds, and a passcode 120 is very sensitive to data loss—if one bit is incorrectly shared, the use of the passcode 120 by the second device may still fail. Transmission of other types of non-speech message 120, such as a URL, using the method of Example 3 may provide acceptable results with a small degree of corruption—for example, if a URL fails, a web search may be sufficient to repair it. Sharing a passcode 120 using the method of Example 3 may typically result in a very long list of characters 130.001-005 to be pronounced separately.

Example 4 provides a further improvement in reliability of the data message transfer by modifying the method used for Example 3. An alternative encoding (e.g., with encoder 110) and decoding (e.g., with decoder 180) is provided using short speakable words.

One of the insights upon which the invention is based is that natural-language systems perform with higher accuracy when actual words are used. In addition, voice-recognition accuracy may be improved by limiting the words being used to a careful selection. This avoids the voice recognition system from having to try and guess from all the possible characters and words in the language, what is being said.

Before encoding and decoding, a speakable word code book is provided, for example, by:
1. Obtaining a list of "short" speakable words—for example three-letter words.
2. Removing any swear words, or words that may cause offence e.g. "sex"
3. Selecting 256 speakable words and generate a code book of eight-bit values The list of "short" speakable words may be any suitable set. However, it may be more advantageous if one or more if the following options are used:
   they are commonly used words as these are more likely to be recognized by a speech recognition system
   they are of the same or similar length, such as three or four-letter words. Any length may be used—the length of the word in letters or characters is indicative of the length of the utterance, so shorter length words may result in a quicker transmission of the message;
   words spoken as a single syllable. This may improve recognition rates and may also result in a quicker transmission of the message.

The method may be implemented using a standardized selection of speakable words, allowing for a high degree of interoperability. It may be advantageous to allow more than one speakable word code book, so that proprietary communication is provided or security is enhanced. Alternatively or additionally, different users may be provided with different code books, providing an additional identification or even authorization of such a user. Alternatively or additionally, the first device may be configured to allow the user to select a speakable word code book. Additionally or alternatively, a user may determine at least partially the speakable word code book.

To encode (e.g., with encoder 110) the non-speech message 120 using the speakable word code book, the binary value of the source message (non-speech message) 120 is divided into a plurality of pieces 120.001-005. For example, each piece 120.001-005 may be eight bits. Each piece 120.001-005 may be encoded as a corresponding three-letter speakable word 130.001-005, with each speakable word forming a piece 130.001-005 of the dissimilar speech message 130, and each speakable word corresponding to an eight-bit piece 120.001-005 of the non-speech message 120.

The accuracy of the voice recognition 170 may be further improved by matching the speakable word set to a local language. With speakable word encoding, a set may be advantageously made for each language—voice-recognition systems 170 are usually configured and optimized based on the languages used locally.

After encoding the non-speech message 120 (the URL) of Example 2 above using an example of a speakable word set according to the method of Example 4, a dissimilar speech message 130 with the following appearance is passed to the speech generator 135, here a Text-To-Speech converter:

```
<speak>
  won wax hey web ham jot wee lie gap too haw yap hum kit bid
  key eek log cap sax mat lip nah moo owe wey nod aft shy dug
  ail eat jar yea bun yak all pay bee age ten nut fix toy tad fan
  oil see for box fed bar gas ore cab cot car pet gab god elf zit
  put nag bay yes jab zag ley its duo hid inn nil pod was tee
  fit boo nit buy ply fib lei pee off cub ego dad foe huh hem
  fur hie apt boa sag hag own fop ice toe lop hay pip oat map
  rum soy saw wet mid keg fly per boy cud pit fat ire nix set
  bow say dim sop did ray
</speak>
```

Each speakable word is a piece 130.001-005 of the dissimilar speech message 130. This SSML example may be rendered as an MP3 speech message 130 of about 30 seconds in length, which is relatively short.

In addition, the accuracy of recognition is expected to be higher because speakable words have been used—the selection of suitable words is preferably based on the degree of reliability in voice recognition.

Alternatively, longer words may be used, such as four-letter or five-letter words.

A speakable word set may also provided comprising single syllable words, and/or words having substantially the same length of utterance. A more consistent cadence (or rhythm) during transmission over channel 150 of the speech message 130 may also improve the reliability of recognition. For example, the following words may be replaced in the speakable word code book used in Example 4: duo, ego, boa.

Additionally or alternatively, less common words may also be avoided in the speakable word set as they are less likely to be considered during voice recognition. For example, the following words may be replaced in the speakable word code book used in Example 4: wey, lei, hie.

Such code books may comprise one or more of the words which are phonetically similar to one or more alphanumeric or ASCII characters, such as: "hey" is similar to "A", "bee" similar to "B", "sea" similar to "C", "fore" is similar to "4". It is not a requirement of the invention that these speakable words are used in the speech message 130 to directly correspond to their alphanumeric presence of a non-speech message 120, such as a URL or credit card number. If there is a direct correspondence, then it should be considered to be coincidental rather than predetermined.

Example 5: uses the method described for Example 4, but to share (transmit) a bitcoin wallet address for receiving payment from a first device, a mobile device, to a second device, a digital assistant.

For example, Alexa may comprise a skill which pays users to perform tasks—to get paid, the user needs to provide their payment details to the skill.

Bitcoin wallet addresses are typically between 27 and 34 characters. This is the non-speech message 120 to be shared. Base58 encoding is typically used in the binary file, stored in memory on the first device. The first device may be configured to display a representation 125 to the user—conventionally, the user shares this information by reading it and typing it manually into the second device. However, wallet addresses are conventionally displayed using a long string representation 125, comprising both upper and lowercase alphanumeric characters. Copying by hand, or any other transfer of the alphanumeric representation 125, is very sensitive to read and typing errors. Providing a letter in the wrong case is very common. One or more incorrect character means that these addresses will not be accepted.

In this example of improved sharing, the non-speech message 120 is shared as follows:

1. The skill comprised in the second device, the digital assistant, requests payment information from the user.
2. The user opens their Bitcoin wallet on the first device, their mobile device, and creates a new address for the transaction.
3. In this example, the address is stored as approximately 25 bytes of data in memory of the first device, with each byte being eight-bits—this is the source message (or non-speech message) 120 to be shared (transmitted).
4. The address may be optionally displayed to the user as an alphanumeric representation 125, for example: 1GeM6Y4SJWvfnFvRyb1qHQ8mbnD6NGqcN3.
5. The user may be optionally prompted to verify the address to be used, or if more than one address is available, to select the address to be used for this transaction.
6. The non-speech message 120 is encoded using a speakable word set and code book, as described above for Example 4.

To encode (e.g., with encoder 110) the non-speech message 120, the binary value of the source message (non-speech message) 120 is divided into a plurality of eight-bit pieces 120.001-005. Each piece 120.001-005 is encoded as a corresponding three-letter speakable word 130.001-005, with each speakable word forming a piece 130.001-005 of the speech message 130, and each speakable word corresponding to an eight-bit piece 120.001-005 of the non-speech message 120.

7. After encoding the non-speech message 120 (the Bitcoin wallet address) using an example of a speakable word set according to the method of Example 4, a speech message 130 with the following appearance is passed to the speech generator 135, here a Text-To-Speech converter:

```
<speak>
  sly ace own lie boy lux fir tut not act wee lam sow
  tip wow tit tam zag zit dry aye fry eye bud boa
</speak>
```

8. Using an audio speaker (e.g., transmitter 140) of the mobile device (the first device), the speech message 130 may be played, transmitting (via transmitter 140) the speech message 130 through the air, which is a suitable audio communications channel 150. The speech message transmitted over channel 150 are sequential pieces 130.001-005 of the speech message 130, in this example 25 speakable words.

The Text-To-Speech converter 135 may be a stand-alone application comprised in the first device, or it may be part of a Bitcoin wallet application. In this example, the SSML may be rendered as an MP3 speech message 130 of about 6 seconds in length.

9. The digital assistant (the second device) comprises a speech receiver 160, such as a microphone 160, and is configured to recognize speech (e.g., via speech/voice recognition 170), so if the mobile device (first device) is disposed proximate the microphone 160, the digital assistant receives (via receiver 160) the speech message over an open-air channel 150.

10. The speech message 130 is recognized 175 and decoded back to the non-speech message (source message) 120, which is passed to the skill.

Example 6: uses the method described for Example 5, but to share (transmit) a Google Authenticator token from a first device, a mobile device, to a second device, a digital assistant.

Security tokens are commonly used to help secure sensitive applications, and may be generated and managed using applications such as Google Authenticator and Microsoft Authenticator. Google Authenticator may be used for access to systems such as Amazon AWS. The token is typically stored in memory on the first device. This is the non-speech (source) message 120 to be transmitted.

The first device may be configured to display a representation 125 to the user—Google Authenticator uses an 8-digit numerical code, for example. Conventionally, the user shares this information by reading it and typing it manually into the second device. One or more incorrect character means that these tokens will not be accepted.

In this example of improved sharing, the non-speech message 120 is transmitted as follows:

1. A user has a cloud services account e.g. for Amazon AWS, with multi-factor authentication enabled to increase security.
2. The User opens the skill comprised in the second device, the Digital Assistant, to check their cloud services account. The skill prompts the user for their authenticator code.
3. The User opens their Authenticator app, which is comprised in the first device, their mobile device.
4. The token in this example is stored as 54 bits (seven bytes) of data in memory on the first device with each byte being eight-bits—this is the source message (or non-speech message) 120 to be shared (transmitted).
5. The token may be optionally displayed to the user as numerical representation 125 for verification and/or selection.
6. The non-speech message 120 is encoded using a speakable word set, similar to Example 5. In this case, however, the speakable word code book is larger and comprises 512 words. By increasing the code book size, it may be possible to reduce the number of pieces 130.001-005, and thus also the number of speakable words used, in the speech message 130. If insufficient commonly-used three-letter words are not available, four-letter words may also be used.

To encode (e.g., with encoder 110) the non-speech message 120, the binary value of the source message (non-speech message) 120 is divided into a plurality of nine-bit pieces 120.001-005. Each piece 120.001-005 is encoded as a corresponding three- or four-letter speakable word 130.001-005, with each speakable word forming a piece 130.001-005 of the speech message 130, and each speakable word corresponding to a nine-bit piece 120.001-005 of the non-speech message 120.

7. After encoding the non-speech message 120 (the authentication token) using the speakable word code book, a speech message 130 with the following appearance is passed to the speech generator 135, here a Text-To-Speech converter:

pug, holy, zit, egg, rate, copy

By using fewer words (here only 6 words in this example), the audio length of the speech message 130 may be reduced. In some cases, the speed of recognition 170 may also be increased as fewer words need to be processed.

8. In this example, the first device does not comprise a speech generator 135. It is, however, configured to display the speech message 130 to a user. If the speech message 130 is relatively short, the whole message may be displayed at once. If not, the device is configured to display the pieces 130.001-005 of the speech message 130 in the order to be transmitted:

pug, holy, zit, egg, rate, copy

9. The user then reads the words aloud, performing the function of speech generator 135, transmitting (via transmitter 140) the speech message 130 through the air, which is a suitable audio communications channel 150.

In other words, the user is comprised in the audio transmission channel 150.

10. The digital assistant (the second device) comprises a speech receiver 160, such as a microphone 160, and is configured to recognize speech (e.g., via speech/voice recognition 170), so if the user's voice is disposed proximate the microphone 160, the digital assistant receives (via receiver 160) the speech message over an open-air channel 150.
11. The speech message 130 is recognized 175 and decoded back to the non-speech message (source message) 120, which is passed to the skill.
12. The skill sends the non-speech message 120 to the cloud service where it is accepted for authentication. The authenticated user then performs their desired cloud service operations.

A further advantage is that the same level of entropy in the password is retained.

Example 7: the reliability of voice recognition for Examples 4 to 6 may be improved by performing an additional step during generation of the speakable word code book. By processing the words with a phonetic encoder, such as Soundex or Metaphone, words which sound alike or are too similar may be excluded from the speakable word code book.

For example, such an optimized code book of 256 speakable words may be provided as follows:

1. A list of the most frequently used words is provided—these are available for many different languages for download. For example, the 5000 most frequently used English words was downloaded from: www.wordfrequency.info.

Additionally, it may be advantageous to influence the selection based upon the frequency of spoken use.

2. This list may be filtered to contain only shorter words. For example, filtering the 5000 words to only these with three and four letters in length provided a list of 1098 words.
3. Optionally, the list may be trimmed down to a size approximating the required number of speakable words in the code book before applying the phonetic filtering. For example, this list of 1098 words was trimmed to the 300 most commonly used words using the ranking on the source website. Alternatively or additionally, one or more user of the language may modify the list based upon current language usage.

4. This list may be phonetically-filtered to remove similar sounding words. For example, the Metaphone3 phonetic algorithm was applied to the 300 words to allocate a phonetic code to each. Where a duplicate or high degree of similarity was found, the most commonly used word was selected. This reduced the set of 300 words to just 265 words.
5. From the phonetically-filtered list, a selection was made of speakable words for the code book. This may be a random selection, or the most common words may be selected, or a combination thereof. For example, 256 words were randomly selected:
half, bad, your, bank, pick, poor, fire, let, near, they, you, grow, sure, pass, old, past, want, them, then, easy, each, eye, stop, must, much, deal, role, fact, cut, dead, turn, hot, two, seek, long, seem, into, how, see, same, term, free, arm, foot, hand, mind, art, set, star, one, team, many, food, stay, call, the, such, pull, face, meet, ask, open, but, bed, die, buy, run, good, down, hold, red, view, late, talk, five, area, add, town, last, test, need, this, its, pay, girl, look, take, she, once, name, know, page, full, drop, next, some, away, idea, kid, book, for, show, back, rule, life, rate, now, end, hard, just, live, sit, news, over, six, race, yes, war, yet, room, way, home, with, what, form, baby, well, risk, age, base, play, very, big, ago, type, hope, when, put, soon, her, road, four, else, far, join, per, plan, case, give, goal, work, wife, lose, come, push, ever, word, care, love, wait, city, wear, guy, air, our, out, lot, fall, top, too, low, get, have, eat, man, side, may, more, sell, draw, kill, lead, off, help, site, able, door, data, use, own, tell, feel, body, upon, him, drug, that, hit, high, son, his, fine, find, than, west, only, few, from, day, all, new, law, read, like, kind, tree, tax, real, less, fill, both, most, keep, true, try, job, send, who, here, note, game, week, line, part, why, best, boy, can, hair, oil, hour, car, and, land, win, make, hear, rest, move, cost, will, also, any, mean, wall, walk.

Each one of these words may be assigned to an eight-bit binary value in the base 10 range of 0 to 255, thereby creating a speakable word code book.

To encode (e.g., with encoder 110) the non-speech message 120 using this speakable word code book, the binary value of the source message (non-speech message) 120 is divided into a plurality of eight-pieces 120.001-005. Each piece 120.001-005 may be encoded as a corresponding speakable word 130.001-005, with each speakable word forming a piece 130.001-005 of the speech message 130, and each speakable word corresponding to an eight-bit piece 120.001-005 of the non-speech message 120.

As this code book is based on a large selection of commonly used words, and optionally common spoken words, it is more likely (compared to the code books of Examples 4 to 6) that one or more of the words may be identical to an alphanumeric or ASCII character. In the exemplary list shown above, "one", "four", "five" and "six" are included. Again, if there is a direct correspondence, this is coincidental rather than predetermined. The degree of indirect correspondence (using a word as a piece 130.001-005 of the speech message 130 that occurs somewhere in the non-speech message 120) is expected to be low. For Example 5, it is no more than 4 words from 256, or approximately 1.5 percent. The degree of direct correspondence (using a word as a piece 130.001-005 of the speech message 130 that encodes the corresponding alphanumeric piece 120.001-005 in the non-speech message 120) is expected to much lower as the assignment of each speakable word to bit-piece in the code book is random, or close to random.

Example 8: The speakable words used in the word sets and code books described above comprise one or more phenomes. The non-speech message 120 may also be encoded based upon individual phenomes. For example, there is an International Phonetic Alphabet (IPA) and a North American Phonetic Alphabet (NAPA) which categorize these distinctive sounds and/or speech segments.

It is therefore possible to construct a code book for encoding and decoding using a list of phonemes. For example:

| Value | Sound |
|---|---|
| 00000 (00) | b |
| 00001 (01) | d |
| 00010 (02) | d͡ |
| 00011 (03) | ð |
| 00100 (04) | f |
| 00101 (05) | g |
| 00110 (06) | h |
| 00111 (07) | j |
| 01000 (08) | k |
| 01001 (09) | l |
| 01010 (10) | m |
| 01011 (11) | n |
| 01100 (12) | ŋ |
| 01101 (13) | p |
| 01110 (14) | ɹ |
| 01111 (15) | s |
| 10000 (16) | ʃ |
| 10001 (17) | t |
| 10010 (18) | t͡ |
| 10011 (19) | θ |
| 10100 (20) | v |
| 10101 (21) | w |
| 10110 (22) | z |
| 10111 (23) | ʒ |
| 11000 (24) | ə |
| 11001 (25) | ɚ |
| 11010 (26) | æ |
| 11011 (27) | aɪ |
| 11100 (28) | aʊ |
| 11101 (29) | ɑ |
| 11110 (30) | eɪ |
| 11111 (31) | ɝ |

Such a code book may be used instead of the code books described above in Example 4 to 6, although dividing the source message (non-speech message) 120 into a plurality of five-bit pieces 120.001-005 is preferred as the number of distinctive sounds is more limited than the number of distinctive words. Preferably thirty-two phenomes are selected for this code book.

Speech messages 130 encoded using a phonetic alphabet are likely to be very short in duration when transmitted over channel 150.

Encoding and decoding may be performed by any suitable combination of hardware and software, with software being the preferred solution because of portability and flexibility.

In the case of a Digital Assistant as transmitter (first device) or receiver (second device), the software may be comprised in a skill, or it may be advantageously comprised in the voice platform. The current voice platforms (Alexa, Google Assistant backed by Dialog Flow) allow for users to have entity or slot detection. In other words, the data type may be expressed, for example for a number or a date. This may increase the accuracy of the speech recognition as context may be provided about the information provided.

For example, when recognizing "my birthday is august eighth nineteen eighty eight", the date is extracted by the platform and returned to the skill as an ISO encoded date "1988-08-08". This is done by specifying the slot and data type at the time of training, for example: "my birthday is <PLATFORM_DATE>".

This may be used with the invention by first transmitting one or more introductory messages, before the data-containing speech message 130 is transmitted. For example, most digital assistants currently need a trigger word to indicate that they are being addressed, so that may be required before each transmission. An indication of the slot or entity may then be provided.

For example, when transmitting the Bitcoin wallet address of Example 5, the actual audio sent may be:

| | |
|---|---|
| "alexa" | (wake-up trigger) |
| "my wallet address is . . . " | (data type) |
| "sly ace own lie boy lux fir tut not act wee lam sow tip wow tit tam zag zit dry aye fry eye bud boa" | (speech message pieces 130.001-005) |

If required, additional audio may also be provided after the speech message pieces 130.001-005 to indicate that no more pieces are to be expected, such as:

"end"

In summary, there are many instances in which information needs to be passed between a first and second computer system/device. If information is short, it may be remembered and retyped on the second device. If too long or complex, it may require a dedicated transmission channel. Audio communications channels have been used to transfer data, but these often require compatible hardware which may not always be available.

A method 100 is provided for communicating a non-speech message 120 as audio from a first device to a second device, the method comprising: encoding the non-speech message as a speech message 130 having a plurality of phonemes; transmitting (via transmitter 140) the speech message over one or more audio communications channels 150 from the first device; receiving (via receiver 160) the speech message 130 at the second device; recognizing (via speech/voice recognition 170) the speech message 130; and decoding the speech message 130 to the non-speech message 120.

By using existing audio functionality, and the increasingly more reliable voice recognition applications, an improved method is provided for sharing complex data messages using commonly available communication channels.

For example, such a non-speech message 120 may comprises one or more of the following:

an URL, a web address, an IP address, a network address, a MAC address, a Bluetooth address, an e-mail address, a search string, a cryptocurrency identification, a cryptocurrency wallet address, an authentication string, a mailing address, a payment token, a PAN number, a TAN number, a payment card number, a credit card number, a card verification code, a CVC code, a bank account number, an IBAN string, a bank routing number, a payment identification string, a Social Security code, a company registration code, a tax registration code, a tax transaction code, a VAT registration code, a SHORT Payment Descriptor, a geographic location, a GPS location, a latitude, a longitude, a user name, an account number, a password, a password token, a passcode, a one-time password, a PIN, a security token, a cryptographic key, a digital signature, biometric data, fingerprint data, login data, network login, WIFI network login, encrypted data, unencrypted data, numeric, alphanumeric, ascii, binary, hexadecimal, an application number, a publication number, a standard number, a part number, a citation to a publication, a catalogue string, a classification string, contact information, a telephone number, an identification number, a passport number, a license number, a certificate number, an IMEI number, an IMSI number, a serial number, a build number, a device identification number, a vehicle identification number, a vehicle registration number, and any combination thereof.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

REFERENCE NUMBER USED IN DRAWINGS 100 method for communicating a non-speech message using audio
110 encoder
120 non-speech message
125 symbolic representation
130 dissimilar speech message,
135 speech generator
140 transmitter or transducer
150 audio communications channel
160 speech receiver
170 voice (speech) recognition,
180 decoder

What is claimed is:

1. A computer-implemented method for communicating a non-speech message as audio from a first device to a second device, the method comprising:
   encoding the non-speech message into a dissimilar speech message having a plurality of phonemes;
   transmitting the dissimilar speech message over one or more audio communications channels from the first device;
   receiving the dissimilar speech message at the second device;
   recognizing the dissimilar speech message; and
   decoding the dissimilar speech message to the non-speech message.

2. The method of claim 1, wherein:
   the dissimilar speech message comprises a plurality of speakable words.

3. The method of claim 1, the method further comprising:
   converting the non-speech message to a transmitter symbolic representation of the non-speech message; and
   displaying the transmitter symbolic representation on the first device.

4. The method of claim 1, the method further comprising:
   converting the non-speech message to a receiver symbolic representation of the non-speech message; and
   displaying the receiver symbolic representation to a user on the second device.

5. The method of claim 1, wherein method further comprises:
   at least partially determining a moment of transmission of the dissimilar speech message based on input from a user.

6. The method of claim 1, wherein method further comprises:
   at least partially determining content of the non-speech message based on input from a user.

7. The method of claim 1, the method further comprising: generating a speakable word code book for encoding and decoding by:
   selecting a list of speakable words to create an initial set;
   selecting a fixed number from the initial set; and
   assigning each one a binary reference value to create the speakable word code book.

8. The method of claim 7, the method further comprising: removing words from the initial set and/or the speakable word code book based on phonetic similarity.

9. The method of claim 7, wherein method further comprises:
   at least partially determining content of the speakable word code book based on input from a user.

10. The method of claim 1, wherein the one or more audio communications channels comprise one or more of the following:
    open-air; a wire; a cable; a fiber; an electromagnetic link; an optical link; a radio link; a microwave link; an infrared link; a satellite link; a land-line telephone (POTS); a voice channel of a mobile telephone; an analog channel; a digital channel; a network; a server computer; a client computer, a display, or any combination thereof.

11. The method of claim 1, wherein:
    a receiver of the speech message is comprised in a digital assistant, a mobile device, a vehicle, a laptop computer, a desktop computer, or any combination thereof.

12. The method of claim 1, wherein:
    a transmitter of the speech message is comprised in a digital assistant, a vehicle, a mobile device, a laptop computer, a desktop computer, or any combination thereof.

13. The method of claim 1, wherein the speech message is transmitted using one or more of the following:
    an audio speaker; a transducer; a human voice, or any combination thereof.

14. The method of claim 1, wherein the speech message is received using one or more of the following:
    a microphone; a transducer; or any combination thereof.

15. The method of claim 1, wherein the non-speech message comprises one or more of the following:
    an URL, a web address, an IP address, a network address, a MAC address, a Bluetooth address, an e-mail address, a search string, a cryptocurrency identification, a cryptocurrency wallet address, an authentication string, a mailing address, a payment token, a PAN number, a TAN number, a payment card number, a credit card number, a card verification code, a CVC code, a bank account number, an IBAN string, a bank routing number, a payment identification string, a Social Security code, a company registration code, a tax registration code, a tax transaction code, a VAT registration code, a SHORT Payment Descriptor, a geographic location, a GPS location, a latitude, a longitude, a user name, an account number, a password, a password token, a passcode, a one-time password, a PIN, a security token, a cryptographic key, a digital signature, biometric data, fingerprint data, login data, network login, WIFI network login, encrypted data, unencrypted data, numeric, alphanumeric, ascii, binary, hexadecimal, an application number, a publication number, a standard number, a part number, a citation to a publication, a catalogue string, a classification string, contact information, a telephone number, an identification number, a passport number, a license number, a certificate number, an IMEI number, an IMSI number, a serial number, a build number, a device identification number, a vehicle identification number, a vehicle registration number, or any combination thereof.

\* \* \* \* \*